Feb. 16, 1965  M. J. KUTIK  3,170,103
SYNCHRONOUS MOTOR CONTROL
Filed Nov. 18, 1960
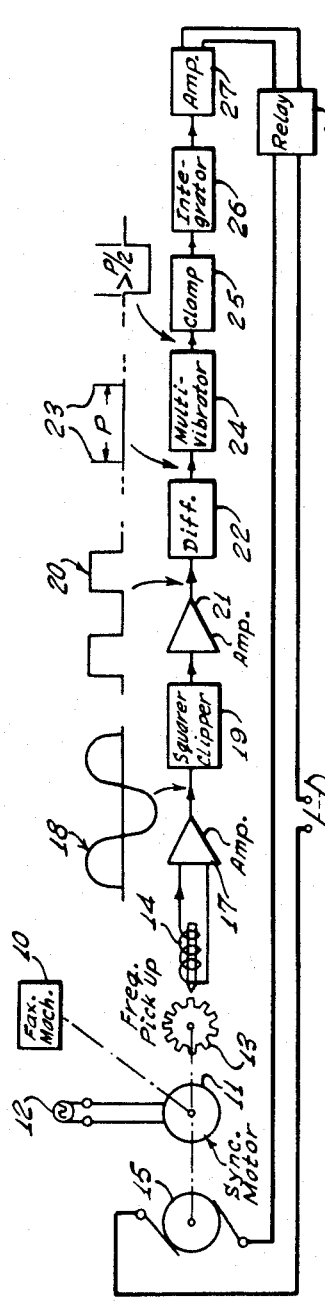
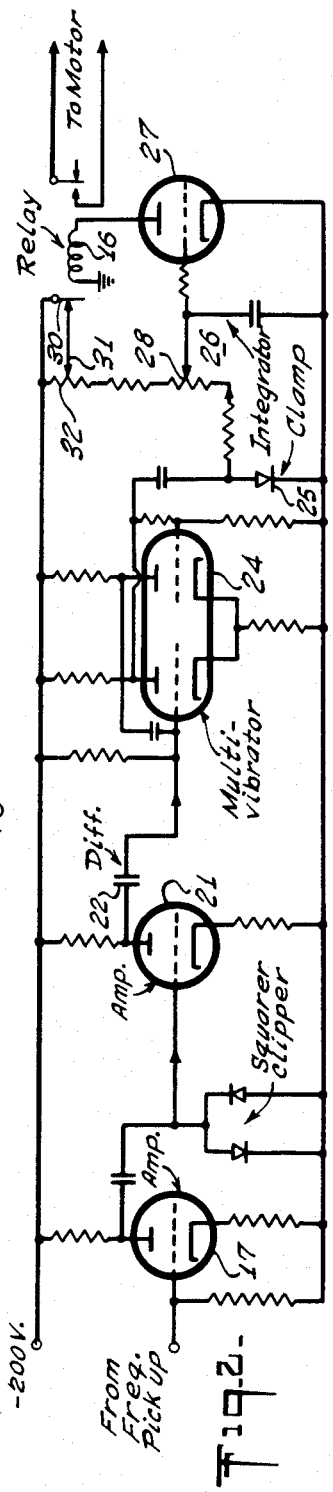
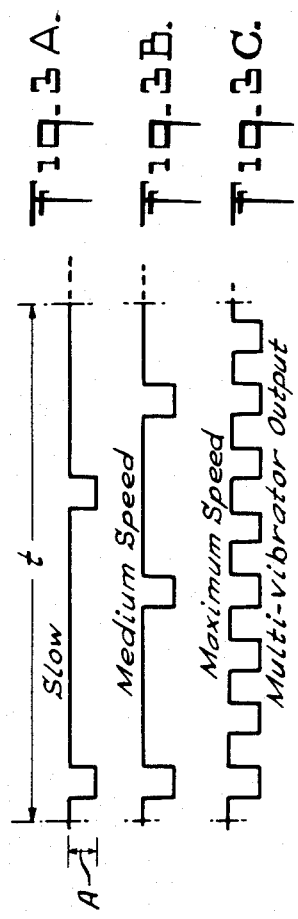
INVENTOR
MARTIN J. KUTIK
BY
ATTORNEY

United States Patent Office 3,170,103
Patented Feb. 16, 1965

3,170,103
SYNCHRONOUS MOTOR CONTROL
Martin J. Kutik, New York, N.Y., assignor to Litton Systems, Inc., a corporation of Maryland
Filed Nov. 18, 1960, Ser. No. 70,172
13 Claims. (Cl. 318—137)

This invention relates to control systems and more particularly it relates to the synchronous operation of a device to be controlled.

A principal object of the invention is to provide a control circuit for a synchronously operating device, such for example as a synchronous motor, whereby the motor speed is used to derive a special motor starting or speed correction signal, so that the synchronous motor or other device can be started and maintained at its synchronous speed.

Another object is to provide a novel circuit arrangement for producing a control voltage dependent on motor speed and used to control operation of an auxiliary or starting motor for a synchronous motor, or other suitable control function.

A feature of the invention relates to a system for obtaining a control signal from an input signal, which control signal varies in substantially direct proportion to the input signal frequency but is relatively independent of the level of said input signal.

Another feature relates to a synchronous motor drive system wherein the synchronous motor is coupled to a non-synchronous motor for bringing the synchronous motor up to synchronous speed; and wherein a sensing device is coupled to the synchronous motor to derive therefrom control waves which are subjected in succession to wave squaring and limiting, pulse differentiation, and multivibrator pulse conversion to derive a series of direct current output waves of uniform amplitude but whose frequency, and thus the average power or current, is responsive to the speed of the synchronous motor.

A further feature relates to the novel organization, arrangement and relative location and interconnection of parts which cooperate to provide an improved synchronous motor control system.

Other features and advantages not specifically enumerated will be apparent after a consideraion of the following detailed descriptions and the appended claims.

In the drawing,

FIG. 1 is a schematic block diagram of a synchronous control system embodying the invention;

FIG. 2 is a schematic wiring diagram of the control circuits of FIG. 1;

FIGS. 3A, 3B and 3C represent typical motor control waves or signals derived from the system of FIGS. 1 and 2.

While the invention finds its primary utility in the bringing of a synchronous motor up to its synchronous speed for starting, it will be understood that in certain of its aspects the invention is applicable to other types of synchronously operating systems. In certain fields of use, for example in facsimile transmitters or recorders, the facsimile machine, for example the facsimile receiver, is required to be driven at precise synchronous speed with respect to a distant transmitter. Ordinarily, synchronous motors of the variable reluctance type are incapable of being brought up to synchronous speed without the use of a separate variable speed driving motor, and if the load on the synchronous motor increases beyond a certain amount, the synchronous motor may tend to stall or drop below its synchronous speed or it may run at half sync speed. The present invention, therefore, is concerned with the maintenance of the synchronous motor at its desired synchronous speed and also with the means for bringing the synchronous motor to its synchronous speed.

FIG. 1 of the drawing shows in block diagram form a typical system embodying the invention. Thus, the block 10 may represent any well known facsimile machine having a scanning element or the like which is arranged to be driven at a predetermined rate under control of a synchronous motor 11 of the variable reluctance type for example. The motor 11 is arranged to be excited from any suitable source 12 of synchronizing signals, which may be generated locally at the receiver or which may be transmitted by any well known transmitting method from a distant facsimile machine. Merely for purpose of explanation, it will be assumed that the source 12 is a stable oscillator generating a synchronizing frequency of 1800 cycles per second. Associated with the motor 11 is a frequency pick-up or sensing device consisting for example of a magnetically toothed wheel 13 which is fastened to the synchronous motor shaft. In magnetic pick-up or inductive relation with the teeth of wheel 13 is a pick-up coil 14 which, therefore, generates substantially sinusoidal waves whose frequency is directly proportional to the speed of rotation of the synchronous motor shaft. In order to bring the synchronous motor from a position of rest up to its synchronous speed, for starting synchronous speed operation, its rotor shaft is coupled to the shaft of an auxiliary variable speed motor 15 which, for example, may be any well known type of induction motor. The power for motor 15 is under control of a relay switch 16 whose operation will be described hereinbelow. Suffice it to say for the present that initially, that is with the synchronous motor at rest or below synchronous speed, the relay 16 closes a power circuit to drive the motor 15, which in turn drives the rotor of synchronous motor 11 above its synchronous speed. The frequency sensing device 13 then goes into operation to open the circuit of motor 15 to allow the synchronous motor to coast until it locks at its synchronous speed under control of the synchronizing signals from source 12. If the synchronous motor should coast down below its synchronous speed or accidentally drop out of synchronism, the sensing device 13 again comes into operation to cause relay 16 to reclose the circuit of motor 15. The duration of operation of the relay 16 is a function of the speed of the synchronous motor since the average operating current applied to it is inversely proportional to the speed of the synchronous motor.

In order to derive the control signals for the motor 15, the substantially sinusoidal waves picked-up by device 14 are amplified in any suitable amplifier 17 and these amplified sinusoidal waves 18 are passed through any well known wave squaring and clipping device 19 to convert them into corresponding uniform amplitude square waves 20 of the same frequency as waves 18. After amplification of the square waves 20 in the amplifier 21, they are passed through any well known wave differentiating network 22 to produce spikes or pulses 23 corresponding for example to the leading edges of the waves 20. These spikes or pulses are then used to trigger any well known form of one-shot mutivibrator 24 whose time constant is less than one-half the minimum period "P" of the pulses 23 in order to permit automatic resetting of the multivibrator between successive pulses. FIGS. 3A, 3B, 3C show typical respective multivibrator outputs for various speed conditions of the synchronous motor.

The output of the multivibrator 24 is then clamped by any well known clamping circuit 25. The clamped pulses are subjected to pulse integration in any well known integrator 26 and the integrated negative pulses are applied as a corresponding negative bias to the control grid of the associated amplifier 27. The output of amplifier 27 is, therefore, $N \times At$, where "N" is the number of cycles in a fixed time period "$t$" and "A" is the amplitude of the pulses. The output of amplifier 27 is then applied to the winding of relay 16 which controls the power circuit of motor 15.

From the foregoing it will be seen that the negative direct current signals applied to the amplifier 27 are proportional to the speed of the rotor of the synchronous motor and their amplitude is independent of the amplitude of the signals picked-up by the device 13, the only requirement being that the amplitude of the picked-up signals by device 13 be above the minimum signal necessary to trip the multivibrator 24.

The amplifier 27 is biased so as to produce maximum plate or output current at zero speed of the motor 11. This normal bias can be controlled by the manually adjustable potentiometer 28. Thus, when the system is to be started in operation and the synchronizing signals are applied to synchronous motor 11, the latter is substantially at rest or at zero speed. Consequently, the relay 16 is energized and closes the power circuit of motor 15, providing the power supply circuit switch 29 is closed. As the speed of the synchronous motor increases, the integrated negative voltage applied to the grid of tube 27 likewise increases until it arrives at a point where insufficient plate current occurs to operate relay 16. This condition of deenergization of relay 16 can be chosen so as to coincide with some predetermined speed of the synchronous motor above synchronism. For example, if motor 11 is designed to operate at 1800 r.p.m. synchronous speed, the relay 16 may be deenergized at 2000 r.p.m.

As the motor 15 loses power, the motor speed drops and eventually the variable reluctance synchronous motor 11 locks in synchronism at its 1800 r.p.m. synchronous speed. The relay 16 may be provided with an additional or auxiliary set of contacts 30 (see FIG. 2), which are connected to the manually adjustable arm 31 of an associated potentiometer resistance 32 for controlling the bias on the grid of amplifier 27. This provides an adjustment of the sensitivity of the system for reenergizing the relay 16 depending upon the setting of potentiometer arm 31. If the motor 11 fails to lock in synchronism and drops below its synchronous speed, the sub-synchronous speed, corresponding to that at which relay 16 reoperates, is controlled by the setting of potentiometer 31.

FIG. 2 shows in more detailed wiring diagram form the essential elements of the system of FIG. 1 and the various corresponding parts of the two figures are designated alike.

It will be understood, of course, that the invention is not limited to any particular kind of frequency sensing or pick-up device providing it produces control waves locked to the frequency of operation of the synchronous motor. Likewise, while in the foregoing description the amplifier 27 is normally biased to maximum plate current to cause the operation of relay 16 when the synchronous motor is at rest or below synchronous speed, and the plate current of amplifier 27 is decreased by providing an integrated negative bias derived from the multivibrator output, it will be understood that the reverse condition may be used. In other words, the tube 27 may be normally biased to plate current cut off when the synchronous motor is at rest and the multivibrator output may result in positive integrated pulses at the grid of the amplifier tube to cause the relay 16 to be operated. It also will be understood that the invention is not limited to the use of electron tubes as amplifiers or as the multivibrator, it being well understood that these elements can be replaced by corresponding well known transistor amplifiers and multivibrators.

Other changes and modifications may be made in the disclosed embodiment without departing from the spirit and scope of the invention.

What is claimed is:

1. In a control system operating in response to a variable-frequency input signal, a wave differentiating network for sharpening the pulses of the input signal, means including a multivibrator connected to the network for generating pulses of uniform size and duration at the frequency of said input signal pulses and integrating means connected thereto for converting said uniform pulses into a continuous signal varying in amplitude with the frequency thereof.

2. A control system according to claim 1 in which a synchronous device is coupled to another device for producing said variable frequency input signals whose frequency is directly related to the movement of said synchronous device, said synchronous device being coupled to a controlled driving member, and circuit connections for applying said continuous signal of varying amplitude to said separate drive member to cause it to bring said synchronous device to synchronous speed.

3. A control system according to claim 2 in which said synchronous device is a synchronous motor and said separate member is another motor which starts and initially drives said synchronous motor to a speed slightly above its synchronous speed, and means for thereafter automatically preventing said separate motor from driving said synchronous motor so long as said synchronous motor is rotating at synchronous speed.

4. In a synchronous motor system, the combination of a synchronous motor arranged to be excited from a source of synchronous frequency, an auxiliary motor for starting said synchronous motor and for driving it to synchronous speed, a speed sensing device for producing a signal frequency which is proportional to the speed of the synchronous motor, means to convert said signal into a series of uniform amplitude waves whose frequency is also proportional to the speed of said synchronous motor, a switch for controlling the circuit of said auxiliary motor, and means to render said switch effective to close said circuit whenever said synchronous motor is operating below its synchronous frequency whereby said auxiliary motor causes said synchronous motor to return to its synchronous speed.

5. In a synchronous motor system, the combination of a synchronous motor arranged to be excited from a source of synchronous frequency, an auxiliary motor for starting said synchronous motor and for driving it to synchronous speed, a frequency pick-up device coupled to said synchronous motor to produce motor control frequencies proportional to the speed of the synchronous motor, converting means to convert said motor control frequencies into a series of uniform amplitude waves whose frequency is also proportional to the synchronous motor speed, means to integrate said converted waves to produce a direct current voltage of varying amplitude determined by the departure of said synchronous motor from its synchronous speed, and means to operate said auxiliary motor under control of said direct current voltage.

6. A synchronous motor system according to claim 5 in which said auxiliary motor is provided with a power control switch, and means to operate said switch to close the auxiliary motor circuit only when said synchronous motor is not running at synchronous speed.

7. A synchronous motor system according to claim 5 in which means are provided for applying said direct current voltage as a bias voltage to the control grid of an amplifier tube whose plate circuit is connected to said switch to control the operation thereof, said amplifier tube being normally biased to a predetermined maximum plate current when said synchronous motor is at rest.

8. A synchronous motor system according to claim 7 in which the said direct current voltage increases in value toward a level sufficient to cut off said amplifier tube during the period said synchronous motor is approaching its synchronous speed.

9. In a synchronous motor system, the combination of a synchronous motor arranged to be excited from a source of synchronous frequency, an auxiliary motor for starting said synchronous motor and driving it to synchronous speed, a speed sensing device for producing a signal frequency which is proportional to the speed of the synchronous motor, means to subject said signal frequency to a squaring and amplitude-limiting step to produce a series of keying pulses having a periodicity proportional to the speed of the synchronous motor, a multivibrator controlled by said pulses to produce a series of substantially square-wave shaped signals of uniform amplitude and a frequency proportional to the speed of said synchronous motor, a relay switch for controlling said auxiliary motor, a grid-controlled tube for controlling said relay, and means to integrate and apply said square shaped waves to control the plate current of said tube and thereby to cause said relay to close the circuit of said auxiliary motor when the synchronous motor is rotating below its synchronous speed.

10. A system according to claim 9 in which said auxiliary motor normally tends to drive said synchronous motor above its synchronous sped to allow said synchronous motor to coast down to its synchronous speed whereupon said relay switch opens the circuit of said auxiliary motor.

11. A system according to claim 9 in which said relay switch comprises a first set of contacts for controlling the circuit of said auxiliary motor and an additional set of contacts for controlling the normal bias on the grid of said tube.

12. A system according to claim 11 in which the grid of said tube is provided with manually adjustable potentiometer means to control the sensitivity of said switch with relation to the departure in speed of said synchronous motor from its synchronous speed.

13. A synchronous motor control system comprising means to excite the synchronous motor with a synchronous frequency, means to derive from the rotation of the synchronous motor a control signal proportional to the speed of said motor, an auxiliary driving motor for driving the synchronous motor, circuit-closing means including a relay switch having a contact for controlling the application of power to said auxiliary motor, said relay switch also having auxiliary contacts, and means to control said relay switch conjointly by said control signal and by the closure of said auxiliary contacts whereby said auxiliary motor brings said synchronous motor up to synchronous speed and is rendered ineffective to drive said synchronous motor when the latter is operating at synchronous speed.

References Cited in the file of this patent

UNITED STATES PATENTS

| | | |
|---|---|---|
| 904,693 | Griffin | Nov. 24, 1908 |
| 2,802,161 | Reagan | Aug. 6, 1957 |
| 2,816,257 | Burdorf | Dec. 10, 1957 |

FOREIGN PATENTS

| | | |
|---|---|---|
| 353,893 | Great Britain | July 22, 1931 |
| 495,999 | Canada | Sept. 8, 1953 |